(12) United States Patent
Yannam et al.

(10) Patent No.: US 11,948,557 B2
(45) Date of Patent: *Apr. 2, 2024

(54) METHODS AND APPARATUS FOR LEVERAGING SENTIMENT VALUES IN FLAGGING AND/OR REMOVAL OF REAL TIME WORKFLOWS

(71) Applicant: Bank of America Corporation, Charlotte, NC (US)

(72) Inventors: Ramakrishna R. Yannam, The Colony, TX (US); Isaac Persing, Sierra Vista, AZ (US); Emad Noorizadeh, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 379 days.

This patent is subject to a terminal disclaimer.

(21) Appl. No.: 17/539,282

(22) Filed: Dec. 1, 2021

(65) Prior Publication Data

US 2023/0169964 A1 Jun. 1, 2023

(51) Int. Cl.
| | |
|---|---|
| *G10L 15/18* | (2013.01) |
| *G06F 3/04817* | (2022.01) |
| *G06F 40/30* | (2020.01) |
| *G10L 15/06* | (2013.01) |
| *G10L 15/16* | (2006.01) |

(Continued)

(52) U.S. Cl.
CPC ...... *G10L 15/1815* (2013.01); *G06F 3/04817* (2013.01); *G06F 40/30* (2020.01); *G10L 15/063* (2013.01); *G10L 15/16* (2013.01); *G10L 15/22* (2013.01); *G10L 15/30* (2013.01)

(58) Field of Classification Search
CPC ..................................................... G06F 40/35
See application file for complete search history.

(56) References Cited

U.S. PATENT DOCUMENTS

| | | | |
|---|---|---|---|
| 11,749,282 B1* | 9/2023 | Mandal | G10L 15/22 |
| | | | 704/251 |
| 2017/0053323 A1* | 2/2017 | Steelberg | G06Q 30/0276 |

(Continued)

OTHER PUBLICATIONS

Al-Ayyoub, Mahmoud, et al. "Hierarchical classifiers for multi-way sentiment analysis of arabic reviews." International Journal of Advanced Computer Science and Applications 7.2 (2016). (Year: 2016).*

*Primary Examiner* — Douglas Godbold
(74) *Attorney, Agent, or Firm* — Weiss & Arons LLP

(57) ABSTRACT

Aspects of the disclosure relate to using an apparatus for flagging and removing real time workflows that produce sub-optimal results. Such an apparatus may include an utterance sentiment classifier. The apparatus stores a hierarchy of rules. Each of the rules is associated with one or more rule signals. In response to receiving the one or more utterance signals, the classifier iterates through the hierarchy of rules in sequential order to identify a first rule for which the one or more utterance signals are a superset of the rule's one or more rule signals. In response to receiving the one or more alternate utterance signals from the signal extractor, the classifier may iterate through the hierarchy of rules in sequential order to identify the first rule in the hierarchy for which the one or more alternate utterance signals are a superset of the first rule's one or more rule signals.

19 Claims, 14 Drawing Sheets

(51) Int. Cl.
  *G10L 15/22*   (2006.01)
  *G10L 15/30*   (2013.01)

(56) References Cited

U.S. PATENT DOCUMENTS

| | | | | |
|---|---|---|---|---|
| 2017/0084295 | A1* | 3/2017 | Tsiartas | G10L 17/08 |
| 2019/0005951 | A1* | 1/2019 | Kang | G10L 15/22 |
| 2019/0013017 | A1* | 1/2019 | Kang | G10L 25/51 |
| 2021/0375272 | A1* | 12/2021 | Madwed | G06F 3/167 |
| 2022/0253611 | A1* | 8/2022 | Galitsky | G06N 5/01 |
| 2022/0335223 | A1* | 10/2022 | Tripathi | G06F 40/35 |
| 2023/0169957 | A1* | 6/2023 | Yannam | G10L 15/30 |
| | | | | 704/259 |
| 2023/0169958 | A1* | 6/2023 | Persing | H04M 3/527 |
| | | | | 704/232 |
| 2023/0169964 | A1* | 6/2023 | Yannam | G06F 3/04817 |
| | | | | 704/232 |
| 2023/0169968 | A1* | 6/2023 | Persing | G06N 3/006 |
| | | | | 704/270 |
| 2023/0169969 | A1* | 6/2023 | Yannam | G10L 15/16 |
| | | | | 704/270 |

\* cited by examiner

| Rule | Label | Signal(s) |
|---|---|---|
| R1 | Upset | =Upset |
| R2 | Affirm | =YES |
| R3 | Deny | =NO |
| R4 | DidNotUnderstand (HelpSuggestion) | =CurrentIntent-SI_HELP_SUGGESTIONS, Signal=Input-Repeated(DifferentIntent) |

FIG. 2

| Sentiment Score | Definition of Sentiment Score |
|---|---|
| -2 | Very negative |
| -1 | Negative, frustration from the number of steps, repeated process |
| 0 | Mid-flows and cases not sure |
| 1 | Conversation goes smooth |
| 2 | Very Positive |

FIG. 3

| Utterance ⌒403 | Input Mode ⌒405 | Response ⌒407 | Label ⌒409 | Sentiment Score ⌒411 ⌒401 |
|---|---|---|---|---|
| How do I transfer money to my other savings account? | Text | No problem, to which account? | FirstUtteranceAndIntentPredicted | 0 |
| Advantage Savings**** | Gesture | No problem, how much would you like to transfer? | ClickParmeter | 1 |
| 100 | Text | Alright, would like to send this transfer now or schdule it for later? | Expected Parameter | 1 |
| Send now | Gesture | Okay, you want to sent $100.00 from adv plus banking**** to adv savings**** on 4/4/2020 | Click Parameter | 1 |
| Yes | Gesture | You're all set, your money was transferred. | Affirm | 1 |

FIG. 4A

| Utterance | Input Mode | Response | Label | Sentiment Score |
|---|---|---|---|---|
| How do I transfer money to my other savings account? | Text | Let's see, to which account? | Cycle | 0 |
| Wedding | Gesture | Sure, from which account? | ClickParameter | 1 |
| adv plus savings**** | Gesture | No problem, how much would you like to transfer? | ClickParameter | 1 |
| 50 | Text | Okay, would you like to send this transfer now or schedule it for later? | Expected Parameter | 1 |
| Send now | Gesture | Okay, you want to send $50.00 from adv plus banking**to wedding** on 4/4/2020. | Click Parameter | 1 |
| yes | Gesture | You're all set, you money was transferred. | Affirm | 1 |
| Wow, amazing! | Text | Thank you! | Positive | 2 |
| Thank you, more! | Text | You're welcome. | Positive | 2 |

FIG. 4B

| Utterance | Response | Label | Sentiment Score |
|---|---|---|---|
| I did not receive all of the check that I ordered. I did not receive package one of five, so who did I call to report this to you? | Here are some things I can do.... | NotSure(Help Suggestion) | 0 |
| Shipping options for check orders | It depends on the shipping method you selected. Here are your options:.... | ClickSuggestion | 1 |
| I only received | Here are some things I can do.... | NotSure(Help Suggestion) | -1 |
| I need to check on the status of the | Let's see, for a business or personal account? | NotInterestedIn Suggestion | -1 |
| Personal account | No problem, what kind of transaction or charge do need a status update on? | ClickParameter | 0 |
| I need a status update on the receipt of the checks that I ordered | It depends on the shipping method you selected. Here are your options:.... | Cycle | -1 |
| I need to speak to a representative because I did not receive all of the checks that I ordered | I can help with these things right now.... or, if you can give me a little more information, I can connect you to the right specialist. | RequestLiveAgent | -1 |

FIG. 5A

| Utterance 503 | Response 505 | Label 507 | Sentiment Score 509 |
|---|---|---|---|
| I only received a partial | Okay, which of your cards are you calling about? | Repeat | -1 |
| I'm not talking about my cards | Please be a bit more specific. Which of your cards are you calling about? | NoSentiment/Mid Flow | -1 |
| None of them | It doesn't look like you have an account for that. How else can I help you? | ClickParameter | -1 |
| I need to speak to a representative because I did not receive all of the checks that I ordered on my personal checking account. | I can help you with these things right now… or I can connect you with someone. | Cycle | -1 |
| Call now | Thank you, Alright. For which account? | RequestLiveAgent (Gesture) | -1 |

FIG. 5B

| Utterance | Response | Label | Sentiment Score |
|---|---|---|---|
| Send money to someone | Who would you like to send money to?... | FirstUtteranceAndClickButton | 0 |
| Add someone using email | I can take you to your transfer settings, and we'll talk again when you're done... | ClickParameter | 1 |
| Let's go | Let me pull that up for you... | Click Parameter | 1 |
| ???? | I can take you to your transfer settings, and we'll talk again when you're done... | NoSentimentMidFlow | 0 |
| Let's go | Let me pull that up for you... | Cycle | -1 |
| Send money | Alright. Would you like to make a transfer between your accounts, send money to someone, or pay a bill?... | Cycle | -1 |
| Send money to someone | Who would you like to send money to?... | Cycle | -1 |

FIG. 6

| Utterance | Label | Sentiment Score | Signals |
|---|---|---|---|
| Where did I open my account | ClickButton | 1 | ... |
| What location did I open my account | DidNotUnderstand (HelpSuggestion) | -1 | Signal=Input-Similar (1StepsBack) ... |
| Customer Service | RequestLiveAgent | -1 | ... |

FIG. 7

METHODS AND APPARATUS FOR LEVERAGING SENTIMENT VALUES IN FLAGGING AND/OR REMOVAL OF REAL TIME WORKFLOWS

FIELD OF TECHNOLOGY

Aspects of the disclosure relate to leveraging sentiment values for use in interactive voice response systems.

BACKGROUND OF THE DISCLOSURE

Interactive response systems are computer-based systems that communicate with users of the system. Exemplary interactive response systems include interactive voice response systems configured to communicate with a user via verbal messages, and chatbots configured to communicate with a user via text messages. The interactive response systems can receive inputs from the user via text, audio and/or gesture (e.g., selection of a displayed icon).

The interactive response systems receive inputs from a user. After an input is received, the system generates a response. Generating the response typically includes iterating through pre-stored rules to identify a suitable response based on the received input.

At times, the response generated by the interactive response system may be misunderstood by, or frustrate, the user. Such suboptimal responses may result in user disappointment with an entity hosting the interactive response system, and may result in negative reviews, unfulfilled business opportunities and, possibly, the loss of the user as an entity customer. However, as the interactive response system is an automated computer system, user emotion such as frustration or discontent is not identified by the system and, as such, is not addressed during the user-system interactions.

At this time, options exist for a customer to rate his interaction with the interactive response system by selecting a happy or sad smiley face after the interaction. This rating system is not useful at least because a customer rarely selects the happy/sad smiley face after the interaction and, even when the face is selected, it provides no clues as to which system response triggered the positive/negative review.

It would be desirable, therefore, to provide systems and methods for enabling the interactive voice response system to identify and score user sentiment in real time for each discrete portion of a conversation. The scoring of user sentiment for discrete conversation portions may be used by the interactive response system to select an appropriate system response to each user utterance and to pinpoint suboptimal system responses.

Machine learning ("ML") is used today for a variety of predictive purposes. ML leverages an algorithm trained using training data to make its predictions. Using machine learning to predict sentiment of a conversation, however, presents a programming team with multiple difficulties. A large number of words/phrases may be used when conversing with the interactive response system. Thus, the volume of training data required to train the algorithm for recognizing sentiment is necessarily huge. Additionally, because understanding sentiment of a current utterance may require knowledge of previous utterances, a large volume of data must be input into the ML to understand the utterance in context. Such methods require the ML algorithm to utilize considerable processing resources to identify user sentiment and may result in delayed output.

As such, it is further desirable to provide systems and methods that leverage ML to predict conversation sentiment without necessitating complex training data sets and large data inputs.

It is yet further desirable to provide systems and methods that leverage ML to remove or otherwise deactivate workflows that produce sub-optimal results.

SUMMARY OF THE DISCLOSURE

A method for pre-processing of an utterance prior to feeding utterance-related data to a sequential neural network classifier for conversation sentiment scoring is provided. The utterance may be expressed, by a user, to an interactive response system during an interaction between the user and the interactive response system. The method may include using a conversation manager to receive a stateless application programming interface ("API") request including the utterance. The conversation manager may also be used to receive previous utterance data and a sequence of labels. Each label may be associated with a previous utterance expressed by a user during the interaction.

The method may also include using a natural language processor to process the utterance to output an utterance intent, a semantic meaning of the utterance and an utterance parameter. The utterance parameter may include one or more words included in the utterance and may be associated with the intent.

The method may also use a signal extractor to process the utterance, the utterance intent, the semantic meaning, the utterance parameter, and the previous utterance data. The signal extractor may generate one or more utterance signals. The one or more utterance signals may correspond to a most probable intent of the user.

When the one or more utterance signals has been previously generated during the interaction and has previously not satisfied the user, then the method may include modifying the one or more utterance signals to correspond to the next most probable intent of the user.

The method may also use an utterance sentiment classifier for storing a hierarchy of rules. Each rule in the hierarchy of rules may be associated with one or more rule signals and a label. In response to receiving the one or more utterance signals from the signal extractor, the method may iterate through the hierarchy of rules in sequential order to identify a first rule in the hierarchy for which the one or more utterance signals are a superset of the first rule's one or more rule signals.

The method may also use a sequential neural network classifier for receiving a data input including the sequence of labels and a label associated with the rule identified by the utterance sentiment classifier. Preferably, the data input does not include the utterance. The sequential neural network classifier may also be used for processing the data input using a trained algorithm and for outputting a sentiment score.

The method may use the conversation manager for identifying a response to the user utterance based on the utterance intent, the label and the sentiment score and for augmenting the stateless API request to include the response, the utterance intent, the semantic meaning, the utterance parameter, the label and the sentiment score. After the augmenting, the conversation manager may be used for transmitting the stateless API request to the interactive response system. The interactive response system may receive the stateless API request and output the response to the user.

The pre-processing of the utterance by the natural language processor, the signal extractor and the utterance sentiment classifier preferably reduces the data input to the label and the sequence of labels, thereby increasing a speed at which the sequential neural network classifier returns the sentiment score and decreasing resources consumed by the sequential neural network classifier when processing the data input.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows an illustrative diagram in accordance with the invention;

FIG. 3 shows an illustrative diagram in accordance with the invention;

FIG. 4A shows an illustrative flow diagram in accordance with the invention;

FIG. 4B shows an illustrative flow diagram in accordance with the invention;

FIG. 5A shows an illustrative flow diagram in accordance with the invention;

FIG. 5B shows an illustrative flow diagram in accordance with the invention;

FIG. 6 shows an illustrative flow diagram in accordance with the invention;

FIG. 7 shows an illustrative flow diagram in accordance with the invention;

DETAILED DESCRIPTION OF THE DISCLOSURE

Figure 1:
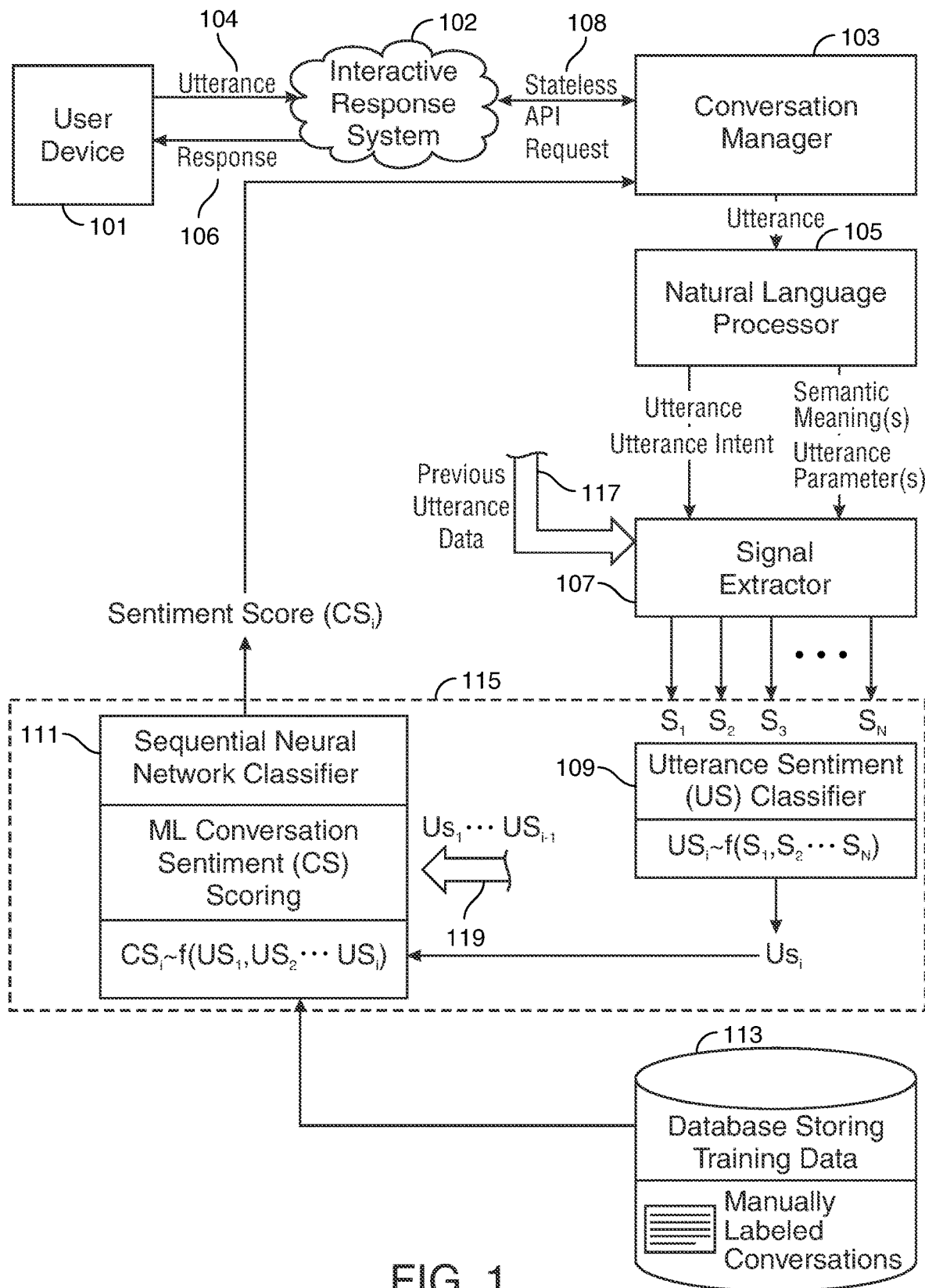
FIG. 1 shows illustrative apparatus and methods in accordance with the invention.

Apparatus and methods for conversation sentiment scoring is provided. The apparatus and methods may include a conversation manager configured to receive requests, each request including an utterance. The utterance may be an utterance expressed by a user during an interaction between the user and an interactive response system. The interactive response system may be an interactive voice response system configured to output verbal messages to the user. The interactive voice response system may also be configured to transmit information to a user's computing device (referred to alternately herein as a 'user device'). The interactive response system may be a chatbot configured to output to the user text messages, verbal messages, selectable icons and/or any other suitable data.

When the interactive response system is an interactive voice response system, the utterance may be a verbal message and/or one or more keypad selections. When the interactive response system is a chatbot, the utterance may be a text message and/or a selection of one or more selectable icons displayed, to the user, on a graphical user interface of the user's device. Exemplary user devices include a laptop, smartphone, smartwatch, or any other suitable computing device.

Each utterance may be processed by apparatus including one or more of a natural language processor, a signal extractor, an utterance sentiment classifier and a sequential neural network classifier. The processing of the utterance may return to the conversation manager a sentiment score and a label. The conversation manager may identify a response to the utterance based at least in part on the sentiment score and the label. The conversation manager may transmit the response to the interactive response system. The interactive response system may output the response to the user. The response may be a voice message, text message, a selectable icon, a graphical user interface display, or any other suitable message.

The apparatus and methods may provide pre-processing of the utterance prior to feeding utterance-related data to the sequential neural network classifier. The pre-processing may be executed by the natural language processor, the signal extractor and/or the utterance sentiment classifier. The sequential neural network classifier may execute conversation sentiment scoring and output the sentiment score.

The methods may include the conversation manager receiving the request. In some embodiments, the request may be included in a stateless application programming interface ("API") request. It is to be understood that, when the request is described as a stateless API request herein, the invention includes embodiments where the request is an electronic request different from a stateless API request.

In some embodiments, the interactive response system may be an API. The API may be a cloud-based API running on one or more servers. The one or more servers may run on the internet.

The user device may access, or run, the cloud-based API. For example, when the interactive response system is a chatbot, stateless API requests detailed herein may be transferred between the cloud-based API running on the user device and the conversation manager. As such, a response to the customer's utterance may be transmitted from the conversation manager to the API, and then output by the API on the customer's device.

When the interactive response system is an interactive voice response ("IVR") system, the user device may connect to the IVR system via a telephone line. The telephony line may input telephony data into the IVR system. In these embodiments, stateless API requests detailed herein may be transferred between the IVR system and the conversation manager. As such, a response to the customer's utterance may be transmitted from the conversation manager to the IVR system, and then output by the IVR system by generating a voice message to the customer device via the telephone line.

The interactive response system may receive the utterance from the user via a telephony network or an internet connection. When the utterance is a first utterance of the user during an interaction between the user and the interactive response system, the interactive response system may generate a stateless API request. The stateless API request may include the utterance. The stateless API request may be associated with the interaction by including a tag, identifying caller/user data, an IP address, or any other suitable user-identifying data.

When the utterance is not the first utterance during the interaction, the interactive response system may augment a stateless API request residing on the interactive response system with the utterance. The stateless API request being augmented may be a request associated with the interaction. The stateless API request may include information relating to previous utterances expressed by the user during the interaction, and, in some embodiments, previous responses generated by the interactive response system and output to the user. Exemplary information stored by the stateless API request may include previous utterance data and a sequence of labels. It is to be understood that 'augmenting' a request may refer to the adding of data to a request.

The interactive response system may transmit the API request, including the utterance, to the conversation manager. The conversation manager may receive the API request.

When the request is a first request generated by the interactive response system during the interaction, the conversation manager may query one or more databases to retrieve a user profile. The conversation manager may then augment the API request with the user profile. The user profile may be retrieved by the conversation manager using identifying data input by the user into the interactive response system, such as an account number, name, address, and/or any other optional or required information. The user profile may be retrieved by the conversation manager using user-identifying data input into the API request by the interactive response system. The profile of the user may include one or more of a username, user account information and/or any other suitable user data.

When the request is a second, third or subsequent API request generated by the interactive response system during the interaction, the API request may include previous utterance data and the sequence of labels. The sequence of labels may be part of the previous utterance data. Each label in the sequence of labels may be associated with a previous utterance.

The previous utterance data may include, for each previous utterance expressed by the user during the interaction, the previous utterance, an intent of the previous utterance, one or more parameters associated with the previous utterance, one or more semantic meanings associated with the previous utterance, an input mode of the previous utterance, a label associated with the previous utterance, a sentiment score associated with the previous utterance, and/or any other suitable previous utterance data.

The input mode may be how the utterance was received by the interactive response system. Exemplary input modes may include voice, text, icon selection, or any other suitable input mode.

The intent of the utterance may be a goal of the user identified in the utterance by the natural language processor. When the interactive response system is a banking application, exemplary goals may be "transfer," "open new account," "auto-pay," "order checks," etc.

The utterance parameter be one or more words or phrases included in the utterance which are associated with the utterance intent. For example, for an utterance "send 100 dollars to my checking account", the utterance intent may be 'transfer' and the associated parameters may be "100 dollars" and "checking account."

The semantic meaning of the utterance may be a concept within the utterance and/or one or more relationships between words in the utterance. Semantic meaning may be assigned to an utterance by natural language processor as described herein.

In some embodiments, the previous utterance data may include data relating to all previous utterances expressed by the user during the interaction between the user and the interactive response system. The previous utterance data may include, for each previous utterance, one or more pieces of the previous utterance data described herein.

In some embodiments, the previous utterance data may include data relating to a predetermined number of previous utterances immediately preceding the utterance. For example, the previous utterance data may include data relating to up to ten previous utterances expressed by the user prior to the current utterance (referred to herein as 'the utterance'). The previous utterance data may include, for each previous utterance, one or more pieces of the previous utterance data described herein. Thus, when an eleventh utterance is expressed, the interactive response system may purge from the stateless API request the first utterance and first utterance related data and add the eleventh utterance to the stateless API request.

The methods may include the conversation manager transmitting the utterance to the natural language processor. In some embodiments, the conversation manager may transmit the utterance to the natural language processor by transmitting the stateless API request to the natural language processor. In other embodiments, the utterance may be transmitted to the natural language processor in a separate data transmission. In some embodiments, previous utterance data may also be transmitted to the natural language processor using either of the aforementioned methods.

The methods may include the natural language processor processing the utterance to output an utterance intent. In some embodiments, the methods may also include the natural language processor processing the utterance to output one or more semantic meanings of the utterance and/or one or more utterance parameters. The natural language processor may use rules and text matching to identify the utterance intent and utterance parameters. For example, an utterance with the text 'transfer' may be associated with an intent of 'transfer.' Text matching may be used to identify this intent. When the utterance is associated with the 'transfer' intent, rules may dictate what parameters to extract from the utterance, such as an account name and a dollar amount. Thus, rules and text matching may be used to identify the utterance parameters. Semantic meaning may be identified using relationships between the words based on known natural language processing methods.

The methods may include the natural language processor transmitting the output data to one or both of the conversation manager and the signal extractor. In some embodiments, the natural language processor may update the stateless API request to include the output data and transmit the updated API request to one or both of the conversation manager and the signal extractor. In other embodiments, the natural language processor may transmit the output data in a data packet to one or both of the conversation manager and the signal extractor. When the data is transmitted to the conversation manager in a data transmission different from the stateless API request, the conversation manager may add the data to the stateless API request.

The methods may include the signal extractor receiving the data output by the natural language processor. The methods may also include the signal extractor receiving the previous utterance data. When the stateless API request is updated with the natural language processor output data and transmitted to the signal extractor, the signal extractor may pull from the stateless API request the NLP output data and the stored previous utterance data. In other embodiments, the signal extractor may receive the previous utterance data from the conversation manager. In embodiments where the natural language processor transmits the output data back to the conversation manager and not to the signal extractor, the conversation manager may transmit the output utterance data and the utterance related data directly to the signal extractor via the stateless API request or a separate data transmission.

The signal extractor may process the utterance data output by the natural language processor and previous utterance data using logic-based text matching, rules and/or artificial intelligence to generate one or more utterance signals.

A first exemplary workflow of a first signal of the signal extractor may include the signal extractor generating a first utterance signal in response to a determination that the utterance intent is identical to an intent of an immediately preceding utterance. The first utterance signal may be 'SI=Intent_Repeated(1StepBack).' A second exemplary workflow for the signal extractor to generate a second signal may be the signal extractor outputting a second utterance signal such as 'SI=Input-PartialMatch' when the utterance is determined to be a sub or superstring of a previous utterance.

A third exemplary workflow for the signal extractor to generate a third signal may be the signal extractor outputting a third signal in response to a determination that the semantic meaning of the utterance is substantially similar to a semantic meaning associated with a previous utterance.

The signal extractor may output a signal each time the signal extractor's pre-stored rules, text matching, and/or AI conditions are met. Thus, the signal extractor may output one utterance signal or a plurality of utterance signals.

The signal extractor may transmit the utterance signals directly to the utterance sentiment classifier either by an electronic data transmission including the utterance signals or by updating the stateless API request to include the utterance signals and transmitting the updated stateless API request to the utterance sentiment classifier. When the utterance signals are not added to the stateless API request, the signal extractor may transmit the utterance signals to one or both of the conversation manager and the utterance sentiment classifier. In embodiments that the conversation manager receives the utterance signals, the conversation manager may update the stateless API request to include the utterance signals.

The methods may include the utterance sentiment classifier receiving the signals. The signals may be received directly from the signal extractor using methods described above, or from the conversation manager.

The methods may include the utterance sentiment classifier storing a hierarchy of rules in a database. Each stored rule may be associated with one or more rule signals and a label. In response to receiving the utterance signals from the signal extractor, the utterance sentiment classifier may iterate through the hierarchy of rules in sequential order to identify a rule in the hierarchy for which the utterance signals are a superset of the rule's one or more rule signals. The iterating may end when a rule is identified. As such, although two or more rules in the hierarchy may satisfy the aforementioned conditions, only the rule highest up in the hierarchy will be identified by the iterating. Any suitable number of rules may be stored by the hierarchy.

The label associated with the identified rule may be transmitted to one or both of the sequential neural network classifier and the conversation manager. The label may be added to the stateless API request and the request transmitted to the sequential neural network classifier, or the label may be transmitted in an electronic transmission not including the stateless API request. The sequence of labels may be received by the sequential neural network classifier from either the utterance sentiment classifier or from the conversation manager. For example, when utterance sentiment classifier transmits the label to the conversation manager, the conversation manager may transmit the label and the sequence of the labels to the classifier.

The methods may also include the sequential neural network classifier receiving a data input including the sequence of labels and a label associated with the rule identified by the utterance sentiment classifier using methods described above. The label may be received from the utterance sentiment classifier or the conversation manager. The sequence of labels may be received from the conversation manager or extracted from the stateless API request. In some embodiments, the data input to the sequential neural network classifier may not include the utterance. The sequential neural network classifier may be any suitable deep learning machine learning algorithm, such as an LS™ algorithm.

The methods may include the sequential neural network classifier processing the data input using a trained algorithm. The methods may further include the sequential neural network outputting the sentiment score. The sentiment score may be a score included in a range of scores, such as −2 to +2, 0 to 5, 0 to 100, −5 to +5 or any other suitable score range.

In some embodiments, the sequential neural network classifier may transmit the sentiment score to the conversation manager. In some embodiments, sequential neural network classifier may add the sentiment score to the stateless API request and subsequently transmit the stateless API request to the conversation manager.

The methods may include the conversation manager receiving the label and the sentiment score. The label and the sentiment score may be received by the conversation manager in any of the methods described herein. The methods may include the conversation manager identifying a response to the utterance based on the utterance intent, the label and the sentiment score.

The response may be identified using a plurality of rules, each rule being associated with one or more of the intent, label and/or sentiment score. For example, a response of 'would you like to transfer to account X or account Y' may be identified based on a first rule stating that when the intent is 'transfer' and the semantic score is above a threshold value. The utterance intent may be received by the conversation manager in any of the methods described herein. However, if the intent is 'transfer' but the semantic score is below a threshold value, indicating a negative user experience during the interaction, a second rule may be used identifying a response of 'would you like me to connect you to customer service.'

In some embodiments, the methods may include the conversation manager transmitting the response to the interactive response system. In some of these embodiments, the methods may include the interactive response system receiving the response and outputting the response to the user.

In other embodiments, after the conversation manager identifies the response, the conversation manager may augment the stateless API request to include the response. In embodiments where the API request has not been previously augmented with one or more of the utterance intent, the semantic meaning, the utterance parameter, the label and the sentiment score, the conversation manager may augment the stateless API request with the response and any of the aforementioned data not yet input from the stateless API request.

In some of these embodiments, after the augmenting, the methods may include transmitting the stateless API request to the user device. Transmission of the stateless API request to the user device may comprise transmitting the stateless API request to the interactive response system in communication with the user device. The interactive response system may receive the stateless API request and output the response to the user.

When the interactive response system is an IVR system, the transmitting the response to the user may include the IVR system generating an audio message to the user. In some of these embodiments, the utterance may be a verbal message expressed to the user by the IVR system.

When the interactive response system is a chatbot, the transmitting the response to the user may include the chatbot generating a text message, generating an audio message, or displaying a selectable icon on a graphical user interface of the user device.

In some embodiments, the methods may further comprise training the sequential neural network prior to the sequential neural network receiving the data input. The training may include feeding an untrained algorithm with multiple sequences of labels. Each label stored in each sequence of labels may be associated with a sentiment score. The training may transform the untrained algorithm to the trained algorithm.

The pre-processing of the utterance by the natural language processor, the signal extractor and the utterance sentiment classifier may reduce the sequential neural network classifier's data input to the label and the sequence of labels. Thus, the classifier assigns the sentiment score to the conversation based on label data only and not data comprising the utterances. This may increase a speed at which the classifier returns the sentiment score relative to a speed needed by the classifier to process data strings including the utterance and the previous utterances. The feeding of the classifier with label data may also decrease resources consumed by the sequential neural network classifier when processing the data input compared to larger resources needed to process utterances themselves.

Furthermore, training the classifier is simplified by requiring only sets of labels and their associated scores, instead of large volumes of all utterances that may be expressed by a user during a conversation and a value associated with each of the utterances.

The aforementioned increase in processing speed may allow the sequential neural network classifier to output a sentiment score fast enough so that the conversation manager can use the sentiment score when selecting a response to the user in real-time.

The systems and methods of the invention may include apparatus for providing the pre-processing of the utterance as described herein. The apparatus may include the conversation manager, the natural language processor, the signal extractor, the utterance sentiment classifier and the sequential neural network classifier. Each of the aforementioned apparatus may perform functions, and have characteristics, as described herein. It is to be understood that apparatus "for" performing a function is apparatus "configured to" perform the function.

The apparatus may include the conversation manager. The conversation manage may include a first processor for receiving the request. The request may be a stateless API request. The request may include the utterance and previous utterance data. The previous utterance data may include the sequence of labels and any other previous utterance data described herein. Each label in the sequence of labels may be associated with a previous utterance expressed by a user during the interaction.

The apparatus may also include the natural language processor for processing the utterance to output the utterance intent, the semantic meaning of the utterance and the utterance parameter. The utterance parameter may include one or more words included in the utterance and associated with the utterance intent.

The apparatus may also include the signal extractor for processing the utterance, the utterance intent, the semantic meaning, the utterance parameter, and the previous utterance data to generate one or more utterance signals. The signal extractor may include one or more processors.

The apparatus may further include the utterance sentiment classifier. The utterance sentiment classifier may include a memory for storing a hierarchy of rules, each rule being associated with one or more rule signals and a label. The utterance sentiment classifier may include a second processor for, in response to receiving the one or more utterance signals from the signal extractor, iterating through the hierarchy of rules in sequential order to identify a rule in the hierarchy for which the one or more utterance signals are a superset of the rule's one or more rule signals, the iterating ending when the rule is identified.

The apparatus may additionally include the sequential neural network classifier for receiving the data input including the sequence of labels and the label associated with the rule identified by the utterance sentiment classifier. The data input may not include the utterance. the sequential neural network classifier may include one or more processors.

The sequential neural network classifier may be configured to process the data input using a trained algorithm. The sequential neural network classifier may be further configured to output a sentiment score.

The conversation manager may be configured to identify a response to the utterance based on the utterance intent, the label and the sentiment score. The conversation manager may be further configured to augment the stateless API request to include the response, the utterance intent, the semantic meaning, the utterance parameter, the label and the sentiment score. After the augmenting, the conversation manage may be additionally configured to transmit the stateless API request to the interactive response system/

The apparatus may include the interactive response system. The interactive response system may be configured to receive the stateless API request from the conversation manager and output the response to the user.

The apparatus may include the third processor for feeding the sequential neural network with training data prior to the sequential neural network receiving the data input. This third processor may be configured to the execute the training, the executing including feeding an untrained algorithm with multiple sequences of labels. Each label stored in each sequence of labels may be associated with a sentiment score. The training may transform the untrained algorithm to the trained algorithm.

Methods for providing pre-processing of an utterance prior to feeding utterance-related data to a sequential neural network classifier for conversation sentiment scoring, the utterance being expressed, by a user, to an interactive response system during an interaction between the user and the interactive response system are provided. The methods may include using a conversation manager to receive a stateless application programming interface ("API") request. The request preferably includes the utterance, previous utterance data and a sequence of labels. Each label may be associated with a previous utterance expressed by a user during the interaction.

The methods may further include using a natural language processor to process the utterance to output an utterance intent, a semantic meaning of the utterance and an utterance parameter. The utterance parameter may include one or more words included in the utterance. The utterance parameter may further be associated with the intent.

The method may also include using a signal extractor to process the utterance, the utterance intent, the semantic meaning, the utterance parameter, and the previous utterance data to obtain one or more utterance signals. The signal extractor may also be used for checking the one or more utterance signals to determine whether, during the interaction, the one or more utterance signals matches a previously-determined, preferably most probable, utterance signal—where the utterance signal reflects a most probable user intent.

To the extent that the one or more utterance signals matches a previously-determined utterance signal, then the signal extractor may determine whether the one or more utterance signals obtained, previously during the interaction, failed to satisfy the user. When the one or more utterance signals matches a previous utterance signal and the sentiment score reflects user di satisfaction, then the signal extractor may shift the predicted intent, which will change the utterance signal, to the next most probable intent. The next most probably intent may then be used for generating one or more alternate utterance signals. To reiterate, generating one or more alternate utterance signals may, in certain embodiments, involve shifting from a highest-probability utterance signal to a next-highest-probability utterance signal. This exemplary shift from a highest-probability utterance signal to a next-highest-probability utterance signal is set forth in more detail below.

The following is one example of a process in which the utterance signal is shifted from a first, most probable intent, to a second, next most probable intent. Given an utterance, the NLP engine may predict a probability distribution over a number of intents. The probability distribution might be the following: [GET_ACCOUNT_NUMBER=0.65, GET_ROUTING_NUMBER=0.30, OPEN_AN_ACCOUNT= 0.04, . . . ]. The NLP engine may inform the conversation manager that the correct intent is the most probable one (in this case, GET_ACCOUNT_NUMBER). Embodiments set forth herein may indicate that the sentiment component (referred to herein, in the alternative, as the sentiment extractor) may detect that the sentiment component has recently—e.g., in the same customer interaction—already predicted GET_ACCOUNT_NUMBER (without success). Instead of repeating its previous error, the sentiment component may change the predicted intent to the GET_ROUTING_NUMBER. Predicting the GET_ROUTING_NUMBER intent preferably changes the extracted signal(s) at least for the reason that the sentiment component would no longer have detected a signal that the same intent got negatively predicted recently.

Further, the method may include using an utterance sentiment classifier to store a hierarchy of rules. Each rule in the hierarchy of rules may be associated with one or more rule signals and a label. In response to receiving the one or more utterance signals, or alternate utterance signals, from the signal extractor, the method may include iterating through the hierarchy of rules in sequential order to identify a first rule in the hierarchy for which the one or more utterance signals are a superset of the first rule's one or more rule signals.

The sequential neural network classifier may be used for receiving a data input including the sequence of labels and a label associated with the rule identified by the utterance sentiment classifier. The data input may not include the utterance. The sequential neural network classifier may also be used for processing the data input using a trained algorithm and for outputting a sentiment score.

A conversation manager may be used for identifying a response to the user utterance based on the utterance intent, the label and the sentiment score; augmenting the stateless API request to include the response, the utterance intent, the semantic meaning, the utterance parameter, the label and the sentiment score; and, after the augmenting, transmitting the stateless API request to the interactive response system.

In some embodiments, the interactive response system may finally be used to receive the stateless API request and output the response to the user.

The pre-processing of the utterance by the natural language processor, the signal extractor and the utterance sentiment classifier may preferably reduce the data input to the label and the sequence of labels, thereby increasing a speed at which the sequential neural network classifier returns the sentiment score and decreasing resources consumed by the sequential neural network classifier when processing the data input.

In some embodiments, in response to a determination that a stored previous utterance is associated with the first rule and the sentiment score associated with the previous utterance is above the threshold value, the method may transmit the label associated with the first rule to the sequential neural network classifier.

In some embodiments, in response to a determination that no stored previous utterance is associated with any rules, the method may include terminating the iterating and transmitting the label associated with the first rule to the sequential neural network classifier.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or programs or by utilizing computer-readable data structures.

FIG. 1 shows illustrative apparatus and methods in accordance with the invention. Apparatus illustrated in FIG. 1 includes user device 101, interactive response system 102, conversation manager 103, natural language processor ("NLP") 105, signal extractor 107, utterance sentiment classifier 109, sequential neural network classifier 111 and database storing training data 113.

The apparatus illustrated in FIG. 1 includes arrows representing a flow of data between the apparatus. In FIG. 1, conversation manager 103 is illustrated as transmitting data to NLP 105 and receiving data from sequential neural network classifier 111. Conversation manager may also support communications allowing for data transmission and/or receipt to some or all of NLP 105, signal extractor 107, utterance sentiment classifier 109, sequential neural network classifier 111 and database storing training data 113. Additional data connections may be established between some or all of NLP 105, signal extractor 107, utterance sentiment classifier 109, sequential neural network classifier 111 and database storing training data 113.

Conversation manager 103 may also be in communication with one or more user databases (not shown). Conversation manager may retrieve from these database(s) user data, such as, for example, user identifying information, user account information, and any other suitable data.

User device 101 is illustrated transmitting utterance 104 to interactive response system 102. Interactive response system 102 may be a cloud-based API running on the user device, an API accessed by the user device through an internet connection, an interactive voice response system communicating with the user device via a telephony line, or any other suitable system. Interactive response system 102 may add the received utterance to stateless API request 108 and transmit stateless API request 108 to conversation manager 103. Utterance 104 may be expressed by a user during an interaction with an interactive response system as described herein.

Conversation manager 103 may transmit utterance 104 to NLP 105. NLP 105 may process utterance 104 to output an utterance intent, and other related data associated with utterance 104, such as semantic meaning and one or more utterance parameters. The output utterance data and, in some embodiments, utterance 104, may be transmitted to signal extractor 107 by NLP 105 or conversation manager 103.

Signal extractor 107 may receive utterance 104 and utterance data from NLP 105. Signal extractor 107 may also receive previous utterance data 117. Previous utterance data 117 may be fed to signal extractor 107 by NLP 105 or conversation manager 103.

Signal extractor 107 may process the data output by NLP 105 and previous utterance data 117. Signal extractor 107 may use one or more rules, algorithms, and/or ML to identify one or more signals.

The one or more signals may be fed to utterance sentiment classifier 109. Utterance sentiment classifier may store a plurality of rules, ordered in a hierarchy, each rule being associated with one or more signals S1 . . . SN and a label. Utterance sentiment classifier 109 may use the received signals S1 . . . SN to identify a rule in the stored rules-based hierarchy for which the received signals are a superset of the identified rule's signals.

Utterance sentiment classifier 109 may output label USi of the identified rule to sequential neural network classifier 111. Sequential neural network classifier 111 may receive label USi from utterance sentiment classifier 109. Sequential neural network classifier 111 may also receive sequence 119 of labels US1 . . . USi−1 from utterance sentiment classifier 109 or conversation manager 103. Sequence 119 of labels US1 . . . USi−1 may be an ordered set of historical labels associated with previous utterances uttered by the user during the interaction with the interactive response system. Sequence 119 of labels US1 . . . USi−1 may include the historical labels ordered, in sequence, from the first or earliest generated label in the interaction to the last, or latest, generated label in the interaction. The latest generated label may be a label generated immediately preceding label USi.

Sequential neural network classifier 111 may use a trained algorithm identify a sentiment score based on input labels US1 . . . USi. The trained algorithm may output a sentiment score CSi based on the processing of input labels US1 . . . USi−1. The trained algorithm may be created by feeding an untrained algorithm with a plurality of manually labeled conversations. The manually labeled conversations may be stored in database storing training data 113. The manually labeled conversations may include a sequence of labels extracted from a conversation, with each label in the sequence being assigned a sentiment score.

In some embodiments, utterance sentiment classifier 109 and sequential neural network classifier 111 may be part of the same component 115. In other embodiments, utterance sentiment classifier 109 and sequential neural network classifier 111 may be separate components.

Sequential neural network classifier 111 may output sentiment score CSi to conversation manager 103. In some embodiments, sequential neural network classifier 111 may also transmit to conversation manager 103 label USi. In other embodiments, utterance sentiment classifier 109 may transmit label USi to conversation manager 103.

Conversation manager 103 may receive sentiment score CSi and label USi. Conversation manager 103 may feed this data, in addition to the utterance intent generated by NLP 105, to one or more rules-based algorithms and/or ML algorithms to identify response 106 to utterance 104. Conversation manager 103 may then transmit response 106 to interactive response system 102 via stateless API request 108. Interactive response system may receive stateless API request 108 from conversation manager 103, and subsequently transmit response 106 to user device 101. The response may be included in the stateless API request received by conversation manager 103. The stateless API request may be augmented not only with the response, but also with some or all of sentiment score CSi, label USi, utterance intent, semantic meaning, utterance parameters and/or signals S1 . . . SN.

FIG. 2 shows illustrative diagram 201 in accordance with the invention. In diagram 201, illustrative rules 202 are shown. One or more of illustrative rules 202 may be included in the utterance sentiment classifier's hierarchy of rules.

Each of rules 202 are associated with a label 203 and a signal 205. In diagram 201, Rule R1 is associated with the label 'upset' and the signal 'upset.' Signal 'upset' may be output by the signal extractor when the text of the utterance includes a term such as 'upset' or another term showing upset emotions. Rule R2 is associated with the label 'affirm' and the signal 'YES.' Signal 'YES' may be output by the signal extractor when the utterance includes the term 'yes' or something similar. Rule R3 is associated with the label 'deny' and the signal 'NO.' Signal 'NO' may be output by the signal extractor when the utterance includes the word 'NO' or something similar. Rule R4 is associated with the label 'DidNotUnderstand(HelpSuggestion)' and the signal 'CurrentIntent-SI_Help_Suggestions, Signal=Input-Repeated(DifferentIntent).' The aforementioned signal may be output by the signal extractor when the utterance is nearly identical to a previous utterance, and the previous utterance has a different intent then the previous utterance.

FIG. 3 shows illustrative diagram 301. Illustrative diagram 301 includes an exemplary list of sentiment scores and their associated definitions. Diagram 301 includes first column 303 having header 'Sentiment Score' and second column 305 having header 'Definition of Sentiment Score.' The sentiment scores illustrated in diagram 301 show an illustrative range of sentiment scores that may be used by the sequential neural network classifier to classify an utterance.

In diagram 301, row 307 includes a sentiment score of '−2' and an associated definition of 'Very negative.' Row 309 includes a sentiment score of '−1' and an associated definition of 'Negative, frustration from the number of steps, repeated process.' Row 311 includes a sentiment score of '0' and an associated definition of 'Mid-flows and cases not sure.' Row 313 includes a sentiment score of '1' and an associated definition of 'Conversation goes smooth.' Row 315 includes a sentiment score of '2' and an associated definition of 'Very Positive.'

FIGS. 4A-4B show an exemplary interaction between a user and an interactive response system in diagram 401. The exemplary interaction illustrated in diagram 401 is an interaction for which the sequential neural network classifier assigned positive sentiment scores. Data displayed in diagram 401 for each interaction includes utterance 403, input mode 405, response 407, label 409 and sentiment score 411.

In diagram 401, input mode 405 is either text or gesture. An input mode of 'text' may refer to a user inputting text via typing on a computer or smartphone during a chat session with the interactive response system. An input mode of 'gesture' may refer to a user selecting an icon displayed on his computing device. For example, response 'no problem, to which account?' may also include displaying to the user multiple selectable icons, each icon identifying one of the user's accounts. The user's next utterance 'Advantage Savings**' associated with the input mode 'gesture' may be a selection, by the user, of a displayed selectable icon entitled 'Advantage Savings**.'

Labels displayed in the label 409 column may be exemplary labels assigned to the displayed utterances by the utterance sentiment classifier. Scores displayed in the sentiment score 411 column may be scores assigned to the displayed utterances by the sequential neural network classifier.

FIGS. 5A-5B show an exemplary interaction between a user and an interactive response system in diagram 501. The exemplary interaction illustrated in diagram 501 is an interaction for which the sequential neural network classifier assigned negative sentiment scores. Data displayed in diagram 501 for each interaction includes utterance 503, response 505, label 507 and sentiment score 509.

An input mode is not displayed in diagram 501. The exemplary interaction illustrated in diagram 501 may be an interaction between a user and an interactive voice response system. As such, each of the user's utterances may be vocal utterances.

Labels displayed in the label 507 column may be exemplary labels assigned to the displayed utterances by the utterance sentiment classifier. Scores displayed in the sentiment score 509 column may be scores assigned to the displayed utterances by the sequential neural network classifier.

FIG. 6 shows a portion of an exemplary interaction between a user and an interactive response system in diagram 601. The exemplary interaction illustrated in diagram 601 may be an interaction between a user and an interactive voice response system. For each interaction between the user and the interactive response system, diagram 601 illustrates the following data: utterance 603, response 605, label 607 and sentiment score 609.

In diagram 601, deflection point 611 is identified. In FIG. 6, deflection point 611 is an identified exchange between the user and the system, during the interaction, before which the sentiment scores were positive/zero valued, and after which the sentiment score were negative values. Identification of deflection point 611 may assist the conversation manager in identifying suboptimal responses by the interactive response system and draw attention to workflows that may need to be fixed, deleted or updated.

Labels displayed in the label 607 column may be exemplary labels assigned to the displayed utterances by the utterance sentiment classifier. Scores displayed in the sentiment score 609 column may be scores assigned to the displayed utterances by the sequential neural network classifier.

FIG. 7 shows a portion of an exemplary interaction between a user and an interactive response system in diagram 701. The exemplary interaction illustrated in diagram 701 may be an interaction between a user and an interactive voice response system. For each interaction between the user and the interactive response system, diagram 701 illustrates the following data: utterance 703, label 705, sentiment score 707 and signals 709.

In diagram 701, deflection point 711 is identified. In FIG. 7, deflection point 711 is a signal generated by the signal extractor for an utterance immediately prior to an utterance request, by the user, for customer service. The signal at deflection point 711 is 'Signal=Input-Similar(1StepsBack).' This signal may indicate that utterance processed by the signal extractor (i.e., "What location did I open my account) is similar to an utterance immediately preceding the processed utterance (i.e., "What location did I open my account"). Repetition, by a user, of an idea immediately preceding a request to contact customer service may be information useful to the customer service agent when the call is transferred. This information may be displayed to the customer service representative when the call is transferred or, if the call is not transferred, stored in a database for future analysis. Utterances that are repeated prior to a request for customer service may identify a suboptimal response by the interactive response system and draw attention to workflows that may need to be fixed, deleted or updated.

Labels displayed in the label 705 column may be exemplary labels assigned to the displayed utterances by the utterance sentiment classifier. Scores displayed in the sentiment score 707 column may be scores assigned to the displayed utterances by the sequential neural network classifier. Signals displayed in signals 709 may be exemplary signals applied to an utterance by the signal extractor.

Figure 8:
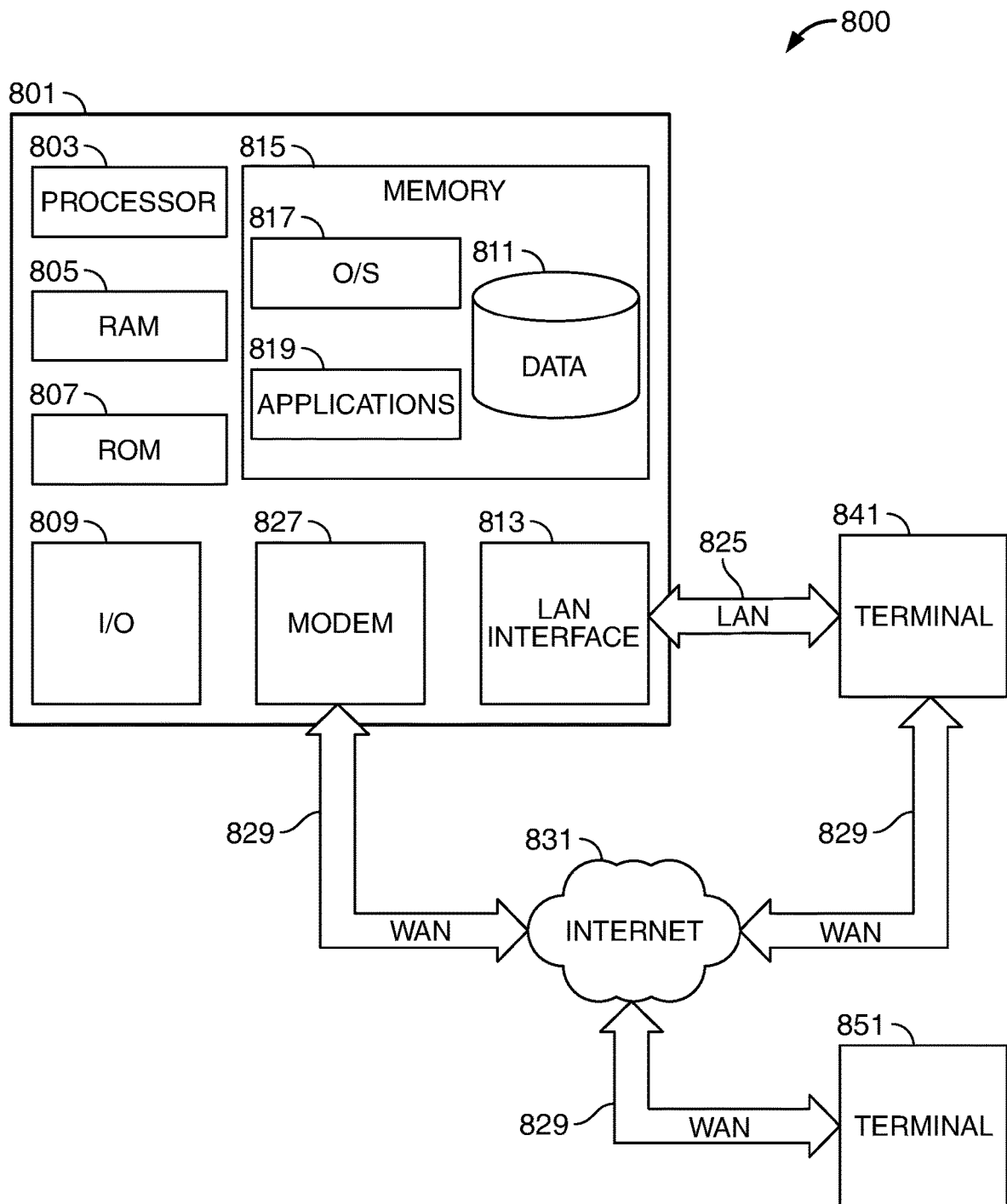
FIG. 8 shows illustrative block diagram of apparatus in accordance with the invention.

FIG. 8 shows an illustrative block diagram of system 800 that includes computer 801. Computer 801 may alternatively be referred to herein as an "engine," "server" or a "computing device." Computer 801 may be a workstation, desktop, laptop, tablet, smart phone, or any other suitable computing device. Elements of system 800, including computer 801, may be used to implement various aspects of the systems and methods disclosed herein. Each of the apparatus illustrated in FIG. 1, including user device 101, interactive response system 102, conversation manager 103, NLP 105, signal extractor 107, utterance sentiment classifier 109 and sequential neural network classifier 111, may include some or all of the elements and apparatus of system 800.

Computer 801 may have a processor 803 for controlling the operation of the device and its associated components, and may include RAM 805, ROM 807, input/output circuit 809, and a non-transitory or non-volatile memory 815. Machine-readable memory may be configured to store information in machine-readable data structures. The processor 803 may also execute all software running on the computer—e.g., the operating system and/or voice recognition software. Other components commonly used for computers, such as EEPROM or Flash memory or any other suitable components, may also be part of the computer 801.

The memory 815 may be comprised of any suitable permanent storage technology—e.g., a hard drive. The memory 815 may store software including the operating system 817 and application(s) 819 along with any data 811 needed for the operation of the system 800. Memory 815 may also store videos, text, and/or audio assistance files. The data stored in Memory 815 may also be stored in cache memory, or any other suitable memory.

Input/output ("I/O") module 809 may include connectivity to a microphone, keyboard, touch screen, mouse, and/or stylus through which input may be provided into computer 801. The input may include input relating to cursor movement. The input/output module may also include one or more speakers for providing audio output and a video display device for providing textual, audio, audiovisual, and/or graphical output. The input and output may be related to computer application functionality.

System 800 may be connected to other systems via a local area network (LAN) interface 813. System 800 may operate in a networked environment supporting connections to one or more remote computers, such as terminals 841 and 851. Terminals 841 and 851 may be personal computers or servers that include many or all of the elements described above relative to system 800. The network connections depicted in FIG. 8 include a local area network (LAN) 825 and a wide area network (WAN) 829, but may also include other networks. When used in a LAN networking environment, computer 801 is connected to LAN 825 through a LAN interface 813 or an adapter. When used in a WAN networking environment, computer 801 may include a modem 827 or other means for establishing communications over WAN 829, such as Internet 831. Connections between System 800 and Terminals 851 and/or 841 may be used for conversation manager 103 to communicate with user device 101.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 819, which may be used by computer 801, may include computer executable instructions for invoking functionality related to communication, such as e-mail, Short Message Service (SMS), and voice input and speech recognition applications. Application program(s) 819 (which may be alternatively referred to herein as "plugins," "applications," or "apps") may include computer executable instructions for invoking functionality related to performing various tasks. Application programs 819 may utilize one or more algorithms that process received executable instructions, perform power management routines or other suitable tasks. Application programs 819 may utilize one or more decisioning processes for the processing of calls received from calling sources as detailed herein.

Application program(s) 819 may include computer executable instructions (alternatively referred to as "programs"). The computer executable instructions may be embodied in hardware or firmware (not shown). The computer 801 may execute the instructions embodied by the application program(s) 819 to perform various functions.

Application program(s) 819 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 811, and any other suitable information, may be stored in memory 815. One or more of applications 819 may include one or more algorithms that may be used to implement features of the disclosure comprising the processing of the utterance by NLP 105, the extracting of signals by signal extractor 107, the outputting of a label by utterance sentiment classifier 109 and the processing of the labels to identify a sentiment score by sequential neural network classifier 111.

The invention may be described in the context of computer-executable instructions, such as applications 819, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 801 and/or terminals 841 and 851 may also include various other components, such as a battery, speaker, and/or antennas (not shown). Components of computer system 801 may be linked by a system bus, wirelessly or by other suitable interconnections. Components of computer system 801 may be present on one or more circuit boards. In some embodiments, the components may be integrated into a single chip. The chip may be silicon-based.

Terminal 851 and/or terminal 841 may be portable devices such as a laptop, cell phone, Blackberry™, tablet, smartphone, or any other computing system for receiving, storing, transmitting and/or displaying relevant information. Terminal 851 and/or terminal 841 may be one or more user devices. Terminals 851 and 841 may be identical to system 800 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 9:
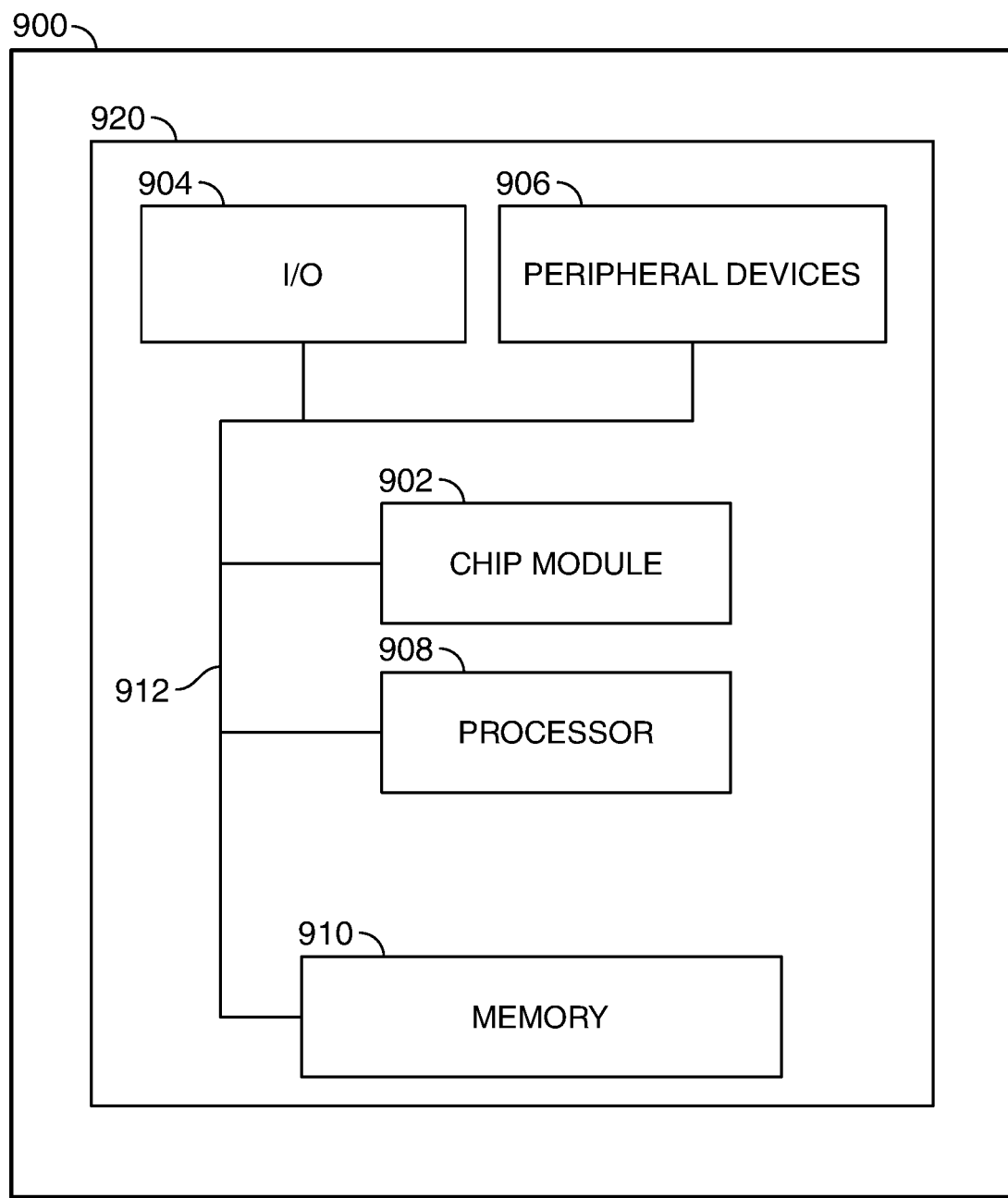
FIG. 9 shows illustrative apparatus that may be configured in accordance with the invention.

FIG. 9 shows illustrative apparatus 900 that may be configured in accordance with the principles of the disclosure. Apparatus 900 may be a computing device. Apparatus 900 may include one or more features of the apparatus shown in FIG. 8. Apparatus 900 may include chip module 902, which may include one or more integrated circuits, and which may include logic configured to perform any other suitable logical operations.

Apparatus 900 may include one or more of the following components: I/O circuitry 904, which may include a transmitter device and a receiver device and may interface with fiber optic cable, coaxial cable, telephone lines, wireless devices, PHY layer hardware, a keypad/display control device or any other suitable media or devices; peripheral devices 906, which may include counter timers, real-time timers, power-on reset generators or any other suitable peripheral devices; logical processing device 908, which may compute data structural information and structural parameters of the data; and machine-readable memory 910.

Machine-readable memory 910 may be configured to store in machine-readable data structures: machine executable instructions, (which may be alternatively referred to herein as "computer instructions" or "computer code"), applications such as applications 819, signals, and/or any other suitable information or data structures.

Components 902, 904, 906, 908 and 910 may be coupled together by a system bus or other interconnections 912 and may be present on one or more circuit boards such as circuit board 920. In some embodiments, the components may be integrated into a single chip. The chip may be silicon-based.

Figure 10:
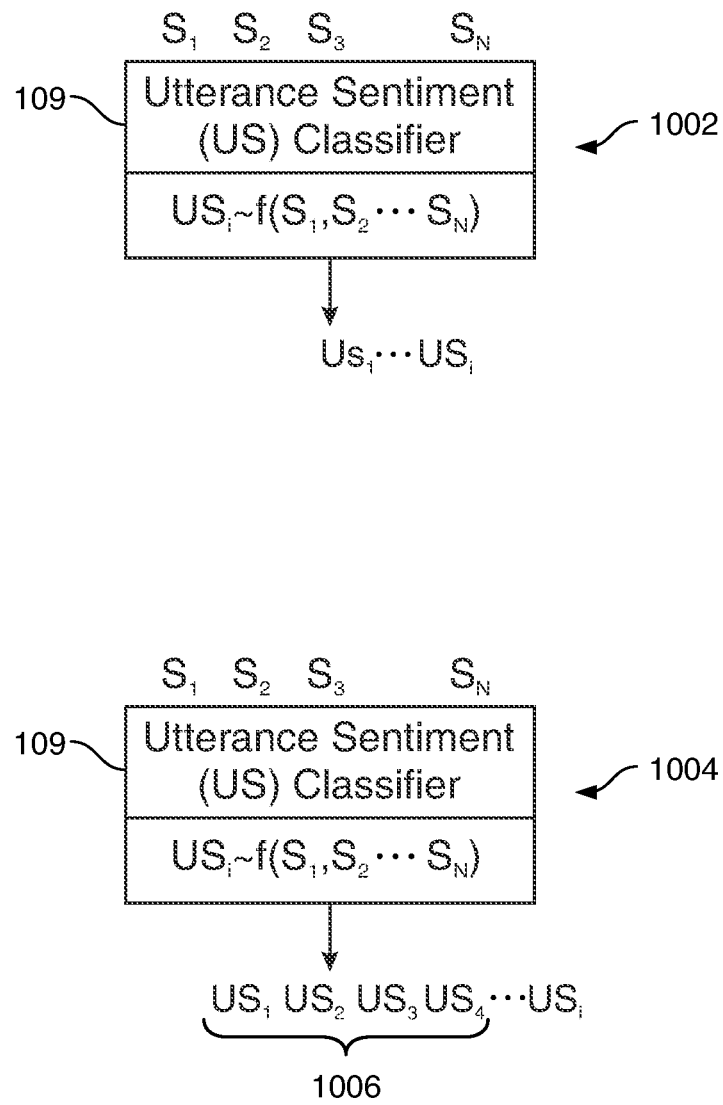
FIG. 10 further granularity of the apparatus shown in FIG. 1, in accordance with the invention.

FIG. 10 shows a snippet 1002 from FIG. 1. FIG. 10 shows element 109 of FIG. 1. Element 109, and its operation, is described above in detail. As mentioned above—the sequence of labels US1 . . . USi–1 may be an ordered set of historical labels associated with previous utterances uttered by the user during the interaction with the interactive response system. The sequence of labels US1 . . . USi–1 may include the historical labels ordered, in sequence, from the first or earliest generated label in the interaction to the last, or latest, generated label in the interaction. The latest generated label may be a label generated immediately preceding label USi.

FIG. 10 also shows element 1004. Element 1004 shows the sequence of labels a list of additional US1 . . . USi. However, FIG. 10 shows this list in additional granularity. Specifically, element 1006 shows this list in additional granularity—i.e., with additional list members US2-US4. In the embodiments relating to FIG. 10 (and FIG. 11), in response to receiving the one or more utterance signals, the classifier iterates through the hierarchy of rules in sequential order to identify a first rule for which the one or more utterance signals are a superset of the rule's one or more rule signals. This rule typically reflects the most probable intent of the user.

Figure 11A:
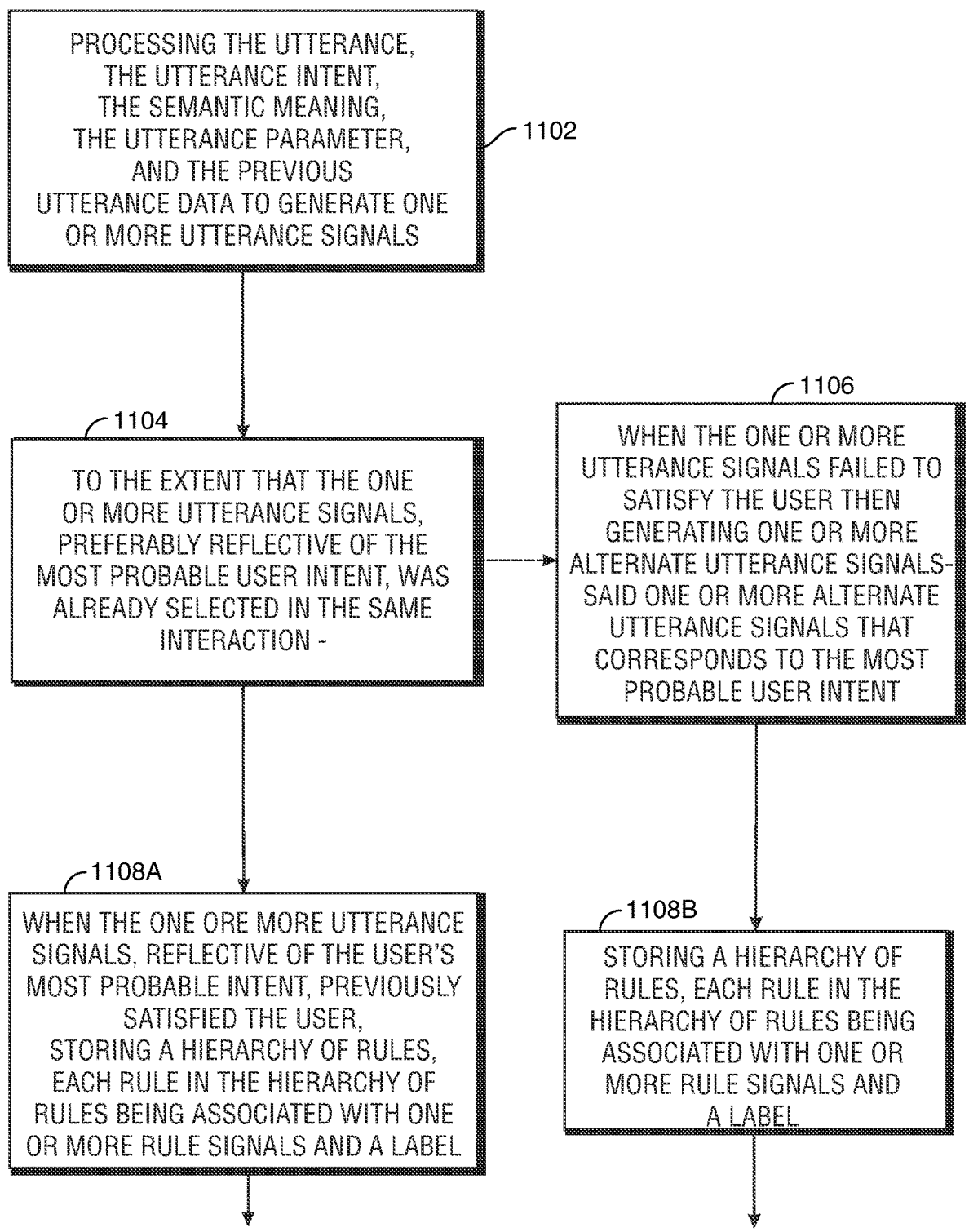
FIG. 11A shows another illustrative flow diagram in accordance with the invention.
Figure 11B:
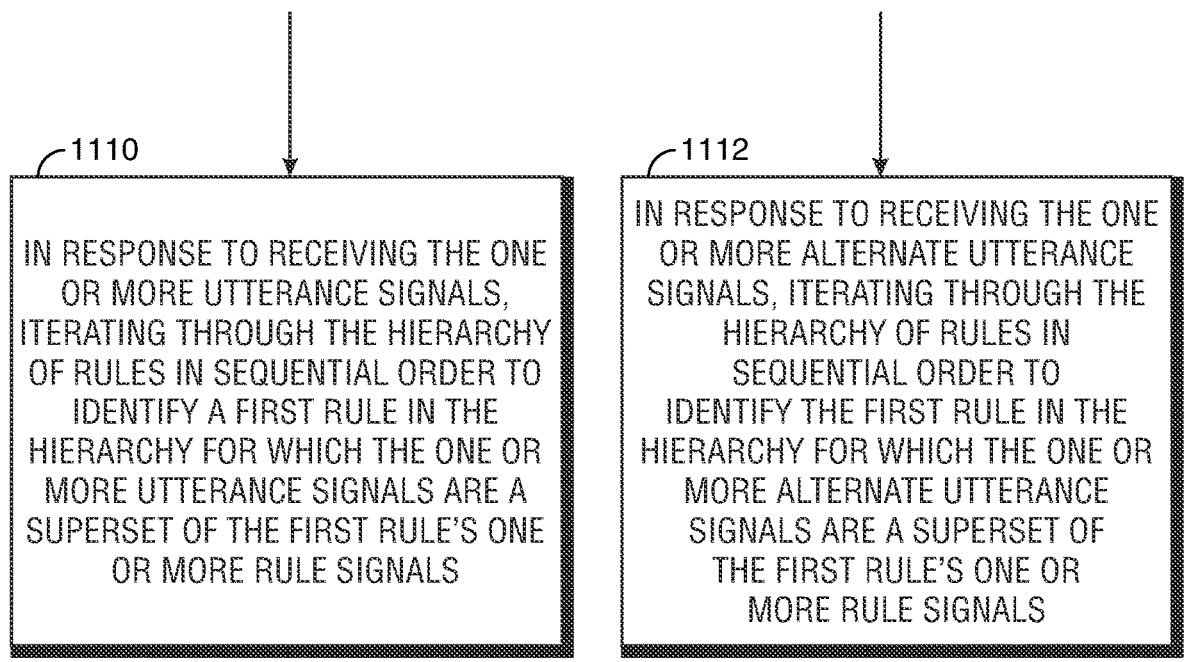
FIG. 11B shows an extension of the illustrative flow diagram in FIG. 11A in accordance with the invention.

FIGS. 11A-11B shows another illustrative flow diagram in accordance with the invention. In FIG. 11A, at step 1102, the method shows processing the utterance, the utterance intent, the semantic meaning, the utterance parameter, and the previous utterance data to generate one or more utterance signals. At 1104, FIG. 11A shows that, to the extent that the one or more of the utterance signals, reflective of the most probable user intent, were already selected in the same user interaction and failed to satisfy the user (as shown in 1106) then the process generates one or more alternate signals. The one or more alternate signals preferably corresponds to the next most probable intent. Following step 1106 (at step 1108B) the process shows storing a hierarchy of rules—wherein each rule in the hierarchy is associated with one or more rules signals and a label and, at 1112, in response to receiving the one or more alternate utterance signals—iterating through the hierarchy of rules to identify the first rule in the hierarchy for which the one or more alternate utterance signals are a superset of the first rule's one or more rule signals.

If it is determined that when the one or more utterances signals, reflective of the most probable user intent, previously satisfied the user, then at 1108A, the process shows storing a hierarchy of rules, each rule in the hierarchy of rules being associated with the one or more rule signals and a label. At 1110, the process shows further, in response to receiving the one or more utterance signals, iterating through the hierarchy of rules in sequential order to identify a first rule in the hierarchy for which the one or more utterance signals are a superset of the first rule's one or more rule signals.

Thus, methods and apparatus for leveraging sentiment values in flagging, modifying and/or removal of real time workflows are provided. Persons skilled in the art will appreciate that the present invention can be practiced by other than the described embodiments, which are presented for purposes of illustration rather than of limitation. The present invention is limited only by the claims that follow.

What is claimed is:

1. A method for providing pre-processing of an utterance prior to feeding utterance-related data to a sequential neural network classifier for conversation sentiment scoring, the utterance being expressed, by a user, to an interactive response system during an interaction between the user and the interactive response system, the method comprising:
   a conversation manager receiving a stateless application programming interface ("API") request including the utterance, previous utterance data and a sequence of labels, each label being associated with a previous utterance expressed by a user during the interaction;
   a natural language processor processing the utterance to output an utterance intent, a semantic meaning of the utterance and an utterance parameter, the utterance parameter comprising one or more words included in the utterance and being associated with the intent;
   a signal extractor:
      processing the utterance, the utterance intent, the semantic meaning, the utterance parameter, and the previous utterance data to generate one or more utterance signals, wherein the one or more utterance signals corresponds to a most probable intent of the user;
      when the one or more utterance signals has been previously generated during the interaction and has previously not satisfied the user, then modifying the one or more utterance signals to correspond to a next most probable intent of the user; and
   an utterance sentiment classifier:
      storing a hierarchy of rules, each rule in the hierarchy of rules being associated with one or more rule signals and a label;
      in response to receiving the one or more utterance signals from the signal extractor, iterating through the hierarchy of rules in sequential order to identify a first rule in the hierarchy for which the one or more utterance signals are a superset of the first rule's one or more rule signals; and
   the sequential neural network classifier:
      receiving a data input including the sequence of labels and a label associated with the rule identified by the utterance sentiment classifier, the data input not including the utterance;
      processing the data input using a trained algorithm; and
      outputting a sentiment score;
   the conversation manager:
      identifying a response to the user utterance based on the utterance intent, the label and the sentiment score;
      augmenting the stateless API request to include the response, the utterance intent, the semantic meaning, the utterance parameter, the label and the sentiment score; and
      after the augmenting, transmitting the stateless API request to the interactive response system; and
   the interactive response system receiving the stateless API request and outputting the response to the user;
   wherein:
   the pre-processing of the utterance by the natural language processor, the signal extractor and the utterance sentiment classifier reduces the data input to the label and the sequence of labels, thereby increasing a speed at which the sequential neural network classifier returns the sentiment score and decreasing resources consumed by the sequential neural network classifier when processing the data input.

2. The method of claim 1 wherein the previous utterance data includes, for each previous utterance expressed by the user during the interaction:
   the previous utterance;
   an intent of the previous utterance; and
   a parameter of the previous utterance.

3. The method of claim 1 wherein the previous utterance data includes data relating to a predetermined number of previous utterances immediately preceding the utterance, the previous utterance data, for each previous utterance, including:
   the previous utterance;
   an intent of the previous utterances; and
   a term in the previous utterance associated with the intent.

4. The method of claim 1 wherein the stateless API request stores a profile of the user.

5. The method of claim 1 further comprising training the sequential neural network prior to the sequential neural network receiving the data input, the training comprising feeding an untrained algorithm with multiple sequences of labels, each label stored in each sequence of labels being associated with a sentiment score, wherein the training modifies the untrained algorithm to become the trained algorithm.

6. The method of claim 1 wherein:
   the interactive response system is an interactive voice response system;
   the user utterance is a verbal message expressed by the user to an interactive voice response system; and
   the transmitting the response to the user comprises the interactive voice response system generating an audio message to the user.

7. The method of claim 1 wherein:
   the interactive response system is a chatbot;
   the user utterance is a text message, or an electronic selection of a selectable icon, input by the user into a graphical user interface displayed on a user mobile device; and
   the transmitting the response to the user comprises the chatbot generating a text message, or displaying a selectable icon, on the graphical user interface.

8. The method of claim 1 wherein:
   the interactive response system is a cloud-based API; and
   the interactive response system generates the stateless API request.

9. The method of claim 1 further comprising transmitting the label associated with the first rule to the sequential neural network classifier.

10. A method for providing pre-processing of an utterance prior to feeding utterance-related data to a sequential neural network classifier for conversation sentiment scoring, the utterance being expressed, by a user, to an interactive response system during an interaction between the user and the interactive response system, the method comprising:
   a conversation manager receiving a request including the utterance, previous utterance data and a sequence of labels, each label being associated with a previous utterance expressed by a user during the interaction;
   a natural language processor processing the utterance to output an utterance intent;
   a signal extractor:
      processing the utterance, the utterance intent, the semantic meaning, the utterance parameter, and the previous utterance data to generate one or more utterance signals, wherein the one or more utterance signals corresponds to a most probable intent of the user; and

23 when the one or more utterance signals has been previously generated during the interaction and has previously not satisfied the user, then modifying the one or more utterance signals to correspond to a next most probable intent of the user;

an utterance sentiment classifier:
storing a hierarchy of rules, each rule in the hierarchy of rules being associated with one or more rule signals and a label;
in response to receiving the one or more utterance signals from the signal extractor, iterating through the hierarchy of rules in sequential order to identify a first rule in the hierarchy for which the one or more utterance signals are a superset of the rule's one or more rule signals;

the sequential neural network classifier:
receiving a data input including the sequence of labels and a label associated with a rule identified by the utterance sentiment classifier, the data input not including the utterance;
processing the data input using a trained algorithm; and
outputting a sentiment score;

the conversation manager:
identifying a response to the user utterance based on the utterance intent, the label and the sentiment score; and
transmitting the response to the interactive response system; and the interactive response system receiving the response and outputting the response to the user;

wherein:
the pre-processing of the utterance by the natural language processor, the signal extractor and the utterance sentiment classifier reduces the data input to the label and the sequence of labels, thereby increasing a speed at which the sequential neural network classifier returns the sentiment score and decreasing resources consumed by the sequential neural network classifier when processing the data input.

11. The method of claim 10 further comprising transmitting the label associated with the first rule to the sequential neural network classifier.

12. The method of claim 11 wherein transmitting of the response to the interactive response system includes the conversation manager:
augmenting the request to include the response; and
transmitting the augmented request to the interactive response system.

13. The method of claim 10 wherein the request is a stateless API request.

14. The method of claim 13 wherein:
the interactive response system is a cloud-based API; and
the interactive response system generates the stateless API request.

15. Apparatus for providing pre-processing of an utterance prior to feeding utterance-related data to a sequential neural network classifier for conversation sentiment scoring, the utterance being expressed, by a user, to an interactive response system during an interaction between the user and the interactive response system, the apparatus comprising:
a conversation manager comprising a first processor for receiving a stateless application programming interface ("API") request including the utterance, previous utterance data and a sequence of labels, each label being associated with a previous utterance expressed by a user during the interaction;

24 a natural language processor for processing the utterance to output an utterance intent, a semantic meaning of the utterance and an utterance parameter, the utterance parameter comprising one or more words included in the utterance and being associated with the intent;

a signal extractor for:
processing the utterance, the utterance intent, the semantic meaning, the utterance parameter, and the previous utterance data to generate one or more utterance signals, wherein the one or more utterance signals corresponds to a most probable intent of the user; and
when the one or more utterance signals has been previously generated during the interaction and has previously not satisfied the user, then modifying the one or more utterance signals to correspond to a next most probable intent of the user;

an utterance sentiment classifier comprising:
a memory for storing a hierarchy of rules, each rule in the hierarchy of rules being associated with one or more rule signals and a label;
a second processor for:
in response to receiving the one or more utterance signals from the signal extractor, iterating through the hierarchy of rules in sequential order to identify a first rule in the hierarchy for which the one or more utterance signals are a superset of the first rule's one or more rule signals;

the sequential neural network classifier for:
receiving a data input including the sequence of labels and a label associated with the rule identified by the utterance sentiment classifier, the data input not including the utterance;
processing the data input using a trained algorithm; and
outputting a sentiment score;

the conversation manager for:
identifying a response to the user utterance based on the utterance intent, the label and the sentiment score;
augmenting the stateless API request to include the response, the utterance intent, the semantic meaning, the utterance parameter, the label and the sentiment score; and
after the augmenting, transmitting the stateless API request to the interactive response system; and the interactive response system for receiving the stateless API request and outputting the response to the user;

wherein:
the pre-processing of the utterance by the natural language processor, the signal extractor and the utterance sentiment classifier reduces the data input to the label and the sequence of labels, thereby increasing a speed at which the sequential neural network classifier returns the sentiment score and decreasing resources consumed by the sequential neural network classifier when processing the data input.

16. The apparatus of claim 15 wherein the utterance sentiment classifier is further configured to transmit the label associated with the first rule to the sequential neural network classifier.

17. The apparatus of claim 15 wherein the previous utterance data includes, for each previous utterance expressed by the user during the interaction:
the previous utterance;
an intent of the previous utterance; and
a parameter of the previous utterance.

18. The apparatus of claim 15 wherein the previous utterance data includes data relating to a predetermined number of previous utterances immediately preceding the utterance, the previous utterance data, for each previous utterance, including:
- the previous utterance;
- an intent of the previous utterances; and
- a term in the previous utterance associated with the intent.

19. The apparatus of claim 15 further comprising a third processor for feeding the sequential neural network with training data prior to the sequential neural network receiving the data input, the training comprising feeding an untrained algorithm with multiple sequences of labels, each label stored in each sequence of labels being associated with a sentiment score, wherein the training modifies the untrained algorithm to become the trained algorithm.

* * * * *

UNITED STATES PATENT AND TRADEMARK OFFICE
CERTIFICATE OF CORRECTION

PATENT NO. : 11,948,557 B2  
APPLICATION NO. : 17/539282  
DATED : April 2, 2024  
INVENTOR(S) : Ramakrishna R. Yannam et al.

Page 1 of 1

It is certified that error appears in the above-identified patent and that said Letters Patent is hereby corrected as shown below:

On the Title Page

Item (72), add:
--Sushil Golani, Charlotte, NC (US), Hari Gopalkrishnan, Plainsboro, NJ (US), Dana Patrice Morrow Branch, Celina, TX (US)--

Signed and Sealed this
Twenty-second Day of October, 2024

Katherine Kelly Vidal
*Director of the United States Patent and Trademark Office*